United States Patent [19]

Gudmundsen

[11] Patent Number: 4,909,044

[45] Date of Patent: Mar. 20, 1990

[54] PARKED AUTOMOBILE THERMAL CONTROL SYSTEM

[76] Inventor: Richard A. Gudmundsen, 12052 Larchwood La., Santa Ana, Calif. 92705

[21] Appl. No.: 350,131

[22] Filed: May 8, 1989

[51] Int. Cl.⁴ .............................................. F25B 27/00
[52] U.S. Cl. .................................... 62/236; 62/244; 98/202; 165/43; 296/97.8
[58] Field of Search ............... 62/244, 323.3, 236; 165/42, 43; 98/202; 160/370.2; 296/97.8, 97.11

[56] References Cited

U.S. PATENT DOCUMENTS

| | | | |
|---|---|---|---|
| 2,328,263 | 8/1943 | De Stefano | 160/370.2 X |
| 2,884,768 | 5/1959 | Gould | 165/43 X |
| 3,128,608 | 4/1964 | Kleist | 165/43 X |
| 3,680,467 | 8/1972 | Brock | 62/244 X |
| 4,280,330 | 7/1981 | Harris et al. | 62/236 X |
| 4,824,160 | 4/1989 | Fleming | 296/97.8 X |

Primary Examiner—William E. Tapolcai
Attorney, Agent, or Firm—Grant L. Hubbard

[57] ABSTRACT

An automobile air conditioning system for controlling the inside temperature of an automobile to maintain the inside temperature in a comfortable range or to protect the contents of the automobile from becoming overheated on excessively hot days or to prevent freezing on cold days when the automobile is parked or not in use is disclosed.

22 Claims, 7 Drawing Sheets

SUMMER OPERATION

FIG. 2b
WINTER OPERATION

PARKED AUTOMOBILE THERMAL CONTROL SYSTEM

BACKGROUND OF THE INVENTION

This invention relates generally to automobile air conditioning systems and specifically to systems for controlling the inside temperature of an automobile to maintain the inside temperature in a comfortable range or to protect the contents of the automobile from becoming overheated on excessively hot days or to prevent freezing on cold days.

Automobile operators and passengers in warmer climates and on unusually hot summer days in most climates experience considerable discomfort when they enter an automobile which has been parked in the hot sun or in an uncooled garage during hot weather. Air conditioning technology for automobiles during operation is a well-developed art, and automobile air conditioners are very common. The most common automobile air conditioners are driven directly from the automobile engine by means of a belt and pulley or some other mechanical linkage. Some automobile air conditioners are driven by an electric motor, such as described in U.S. Pat. Nos. 2,970,456, and 4,038,835. The prior art electrically driven units are not suitable for prolonged use except when the automobile engine is running because of the high energy consumption of such units.

Automobile air conditioners of the conventional type may be described as "brute force" systems, because little or no effort is made to prevent heat transfer in or out of the automobile, the emphasis being on large and powerful air conditioning units.

Various efforts have been made to use solar energy, e.g. as described in U.S. Pat. Nos. 4,307,575, 3,943,726, 4,658,597, and 4,658,599, but such units have not gained general acceptance.

There are many types of sunshades, reflection devices, etc., to control or prevent the sun from shining through a window, or to provide for entry of light with some degree of thermal insulation. Examples of this class of devices are described in the following U.S. Pat. Nos. Des. 296,430, 1,444,735, 1,648,994, 2,111,350, 2,267,542, 2,382,566, 2,514,316, 2,546,438, 2,547,632, 2,619,168, 2,717,036, 2,745,150, 2,874,612, and 3,126,052.

Temperature control devices for automobile and aircraft compartments, etc., are in common use. One such device is described in U.S. Pat. No. 4,497,240.

Brock, U.S. Pat. No. 3,680,467, discloses an air conditioner powered by compressed air which could operate for a period independently of the automobile engine, and which includes a retractable shade over the windshield and tinted windows to reduce solar heat in the car.

It is common practice in warmer climates to leave a small opening at the top of the windows to permit some circulation of air and the escape of heated air from an automobile parked in a hot location. This practice is of little value and introduces some security risk as it is possible to open most automobile doors with a wire if access can be gained through a window.

SUMMARY OF THE INVENTION

A system is provided for maintaining a reasonably low inside temperature in an automobile parked in the full sun and at the same time is in a hot ambient atmosphere, for a period of 6 or more hours. In most instances, it is sufficient that the system operate for from about 2 to about 8 hours, the precise operating time is not, however, a critical factor. The invention comprises a combination of insulation means, solar reflection means, and battery powered refrigeration means. The insulation means prevents viewing of objects left inside car, and thus provides for greater security. Indicia, such as the owners name, telephone number, etc., a family coat of arms, advertisements, etc., may be placed on the insulation means to be viewed by those who pass by the parked automobile.

The areas to be insulated include top, sides, doors, bottom, and all windows as well as the fire wall and trunk wall. All non-window areas will require a thermal insulation about 15 to 20 mm thick. The front and rear windows will be insulated with 15 mm thick pads which are stored in the roof compartment of the car. These pads may be pulled down by and or driven by motors to slide down in place over the windows when the car is locked and a command to do so has been given by the driver prior to or after exiting the car. The outside surface of the pads would be highly reflective to sunlight. The side window insulating pads are preferably stored in the doors and slid upwards in a manner similar to the windows but inside the windows. Mechanical or electrical drives for moving the window insulating pads to cover the windows may be provided, or the pads may be moved by hand. For example, these pads may be moved by motors set in motion when the doors were locked and by permission of the driver's command given to the automobile's computer upon leaving the car. A small auxiliary compressor driven by a battery-operated motor supplies the refrigeration to make up for the heat leakage through the insulation. In cold climates, a reverse-cycle heat pump may be used to make up for heat loss through the pads when the car is parked. Preferably, all temperature control functions are under the control of the automobile operating computer, which is standard on larger automobiles, or from a special microprocessor, having an input from a thermal transducer inside the car and, if desired, a thermal transducer which measures the exterior of the car.

The invention is an improvement in automobiles which comprise a body defining a passenger compartment, window openings and door openings, doors covering the door openings defining window openings in the doors, windows covering the window openings in the body, and an electric storage battery. The improvement is embodied in a thermal control system for controlling the temperature inside the body during periods of parking. The thermal control system comprises: insulating means comprising a plurality of insulating pads, the insulating pads being moveable, respectively, from a position covering the respective windows in the body and the doors to a position revealing said windows to permit vision therethrough from the passenger compartment; refrigeration and/or heating means for selectively cooling or heating the passenger compartment during periods of periods of parking, and control means for connecting the refrigeration and/or heating means to the storage battery for powering and operating the refrigeration and/or heating means in accordance with predetermined control criteria. The insulating means is so constructed and disposed over the windows as to limit the heat flow into and out of the passenger compartment to the exterior of the automobile to no greater than a predetermined rate when the exterior of the car is at temperatures above about 80° F. and no greater than about 130° F. The refrigeration and/or heating means is so constructed and designed as to be capable, when connected to the battery means, of introducing cooling or heating into the passenger compartment at about said predetermined rate. The insulation value of the insulating means, the electrical storage capacity of the storage battery and the coefficient of performance of the refrigeration and/or heating means are, respectively, such that the refrigeration and/or heating means is capable of maintaining the temperature in the passenger compartment at a temperature of from about 80° F. to about 90° F. when the temperature outside the automobile is from above 90° C. and up to about 130° C. for a period of from about two to about eight hours without using more than about one-half of the electric energy capable of being stored in the battery, and of maintaining the temperature in the passenger compartment at a temperature of from about 32° F. to about 50° F. when the temperature outside the automobile is from below 30° F. and above about −30° F. for a period of from about two to about eight hours without using more than about one-half of the electric energy capable of being stored in the battery.

Preferably, the insulation value of the insulating means, the electrical storage capacity of the storage battery and the coefficient of performance of the refrigeration and/or heating means being, respectively, such that the refrigeration and/or heating means is capable of maintaining the temperature in the passenger compartment at a temperature of from about 80° F. to about 90° F. when the temperature outside the automobile is from above 90° C. and up to about 110° C. for a period of from about two to about eight hours without using more than about one-fourth of the electric energy capable of being stored in the battery and of maintaining the temperature in the passenger compartment at a temperature of from about 35° F. to about 50° F. when the temperature outside the automobile is from below 30° F. and above about −30° F. for a period of from about two to about eight hours without using more than about one-fourth of the electric energy capable of being stored in the battery.

In an even more preferred embodiment, the insulating means, the electrical storage capacity of the storage battery and the coefficient of performance of the refrigeration and/or heating means being, respectively, such that the refrigeration and/or heating means is capable of maintaining the temperature in the passenger compartment at a temperature of from about 80° F. to about 90° F. when the temperature outside the automobile is from above 90° C. and up to about 110° C. for a period of from about two to about eight hours without using more than about one-tenth of the electric energy capable of being stored in the battery and of maintaining the temperature in the passenger compartment at a temperature of from about 35° F. to about 50° F. when the temperature outside the automobile is from below 30° F. and above about −30° F. for a period of from about two to about eight hours without using more than about one-tenth of the electric energy capable of being stored in the battery.

BRIEF DESCRIPTION OF THE DRAWINGS

FIG. 2-A is a schematic diagram of the operating components of the air conditioner system, showing operation in summer, and FIG. 2-B is the system showing winter operation.

DESCRIPTION OF THE PREFERRED EMBODIMENT

FIG. 1 is a generalized schematic depiction of an automobile incorporating the fundamental features of this invention. It is to be recognized that the invention has universal applicability to all automobiles, and that the particular style of the automobile, the number and size of the windows, etc., are not particularly significant with respect to the applicability of the invention, since the invention can be adapted to virtually any automobile style by those having ordinary skill in the design of automobiles, based upon the disclosure herein.

The automobile 100 is depicted as being exemplary and that it has a windshield 102, back window 104, and two side windows 106 and 108. The automobile is shown in partial cutaway, and partial cross-section, and, therefore, does not shown the two windows opposite to the reader's side of the automobile which, of course, would be treated in exactly the same way as described herein.

One of the features of this invention is the provision of an insulating pad 112, the features of which will be described in greater detail, which is movable between two of more positions, one position of which is to cover the windshield to reduce the amount of energy flow in or out of the passenger compartment through the windshield. A comparable insulating pad 114 is also movable at least from a position covering the back window to a position not covering the back window, for reducing the heat of energy in or out of the automobile passenger compartment through the back window.

Insulating pads 116 and 118, respectively, are movable from a position covering window 106 and, respectively, 108. The pads 116 and 118 are shown partially covering the respective windows. Smaller windows, such as shown at 117, may be formed of double-pane dark glass with an air space between the panes.

The recessed location (now an insulating dead-air space) of the insulating panel 112 is shown at 122, and a comparable dead air space for storing the insulating pad 114 is shown at 124. Insulation, such as shown at 123, may be provided where a dead air space is not provided. The insulating pads or panels 112 and 114 will, in a simplified embodiment, extend a short distance, approximately one inch, above the floor of the roof compartment, the roof compartment being defined by the outer roof and the inner lining of the car. In this manner, the insulating pad 112 can be grasped by the user and pulled down in suitable tracks or other supports, or simply held by its own rigidity, to cover the windshield. When the insulating pad 112 is in its down position covering the windshield, the dead-air space it leaves behind will still serve to insulate the roof in that area. Similarly, the insulating pad 114 may be grasped and pulled down to cover the back window.

Insulating pads 116 and 118 may be moved by way of handles 126 and 128 to the closed position where they cover, respectively, windows 106 and 108. In this embodiment, the panels extend slightly above the edge of the window opening, and the user simply grasps the protuberances which form the handles 126 and 128 and slide the panels in the up position or in the down position. The panels may be held in the up position simply by friction in the slide or by some other mechanism.

Since the precise structure and method of supporting the insulating panels is not critical to this invention, and because the method of moving the insulating panels to a position closing the windows or to a position wherein the panels are recessed and the windows are exposed is not critical, the mode described is simplified to show the simple manual moving of these insulating panels from one position to the other. There are, of course, great many moving mechanisms which may be used to move a panel from one position to another. With respect to the side windows, for example, a duplicate of the mechanism by which the windows are rolled up and down, as attached to and applied to the movable insulating panels, could conveniently be used. Similarly, an electrical, hydraulic or mechanical drive can be provided to move the panels to cover the windshield and the back window, as desired.

The automobile with will, as is conventional, have a door lock, indicated at 132, and, in accordance with this invention, will be provided with an auxiliary lock-switch 134 for setting the automobile thermal control system into operation after locking the car. In systems in which motor, air or hydraulic drives are provided for moving the panels, or equivalent films, etc., the lock-switch will actuate these drive mechanisms and the compressor system either instantaneously or on a timed schedule.

Figure 1A:
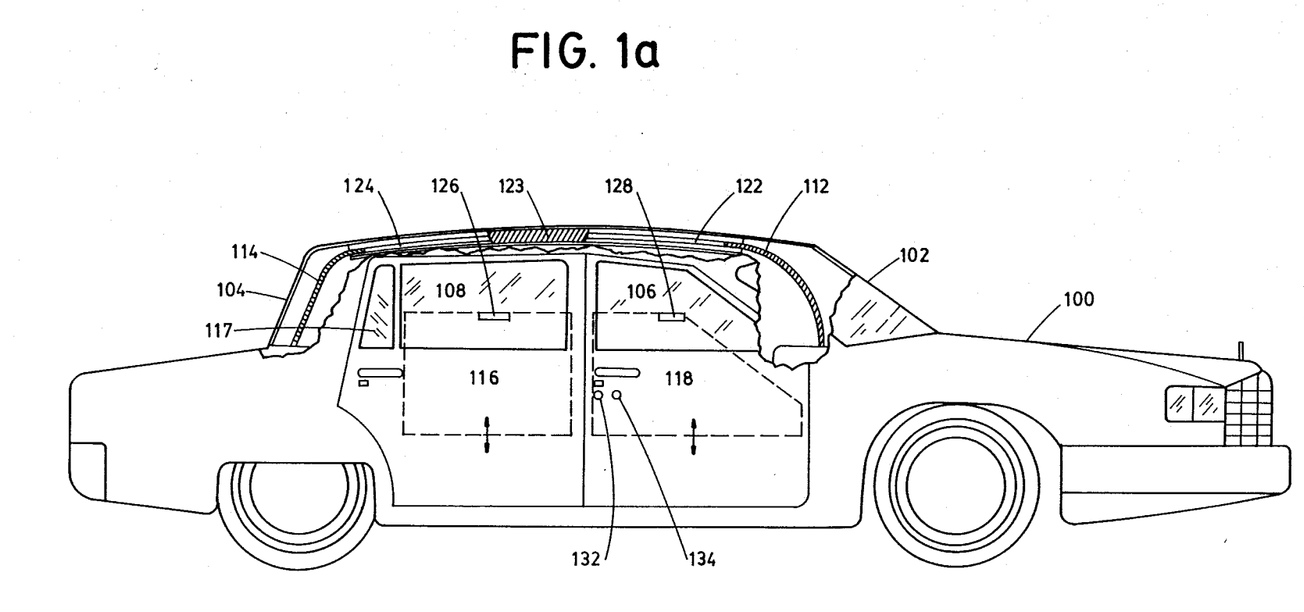
FIGS. 1A, 1B, and 1C are different embodiments of the thermal insulating pads. In 1A the insulation means is a flexible plastic foam; in 1B it is dead-air spaces formed by pockets in a flexible plastic pad. In 1C it is the dead-air space formed between the window and a tight-fitting opaque plastic membrane.
Figure 1B:
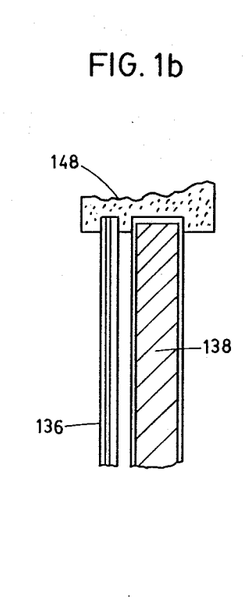
Figure 1C:
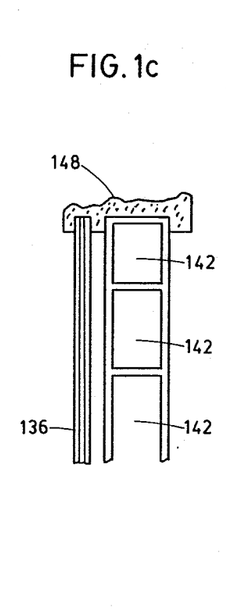
Figure 1D:
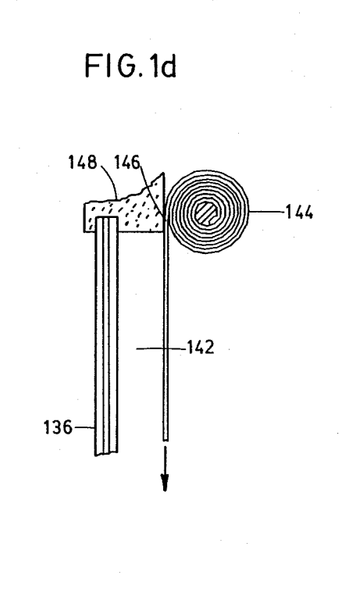
FIG. 1 is a side view, largely schematic, of an automobile, portions of which are cut away and shown in cross-section, showing the placement of thermal insulating pads for the front and back window and the side windows.

Referring now to FIGS. 1A, 1B, and 1C, alternative and equivalent panels or panel equivalents are depicted. Inside the conventional safety glass 136, held in place by the window frame 148, the panel may comprise a polymeric foam or other flexible insulation 138, as shown in FIG. 1A, a spaced-layer structure 142 which has two, or more, layers held in spaced apart relationship with dead air between them, as shown in FIG. 1B, or a membrane 144 which may be rolled or otherwise retracted and may be held in position spaced from the glass to confine a dead air space between the membrane and the window. Polycarbonate films and Mylar films, which may be darkened and/or coated with a thin layer of reflective material, e.g. aluminum or chromium, to reflect or absorb light may be used as the membrane 144.

Figure 2A:
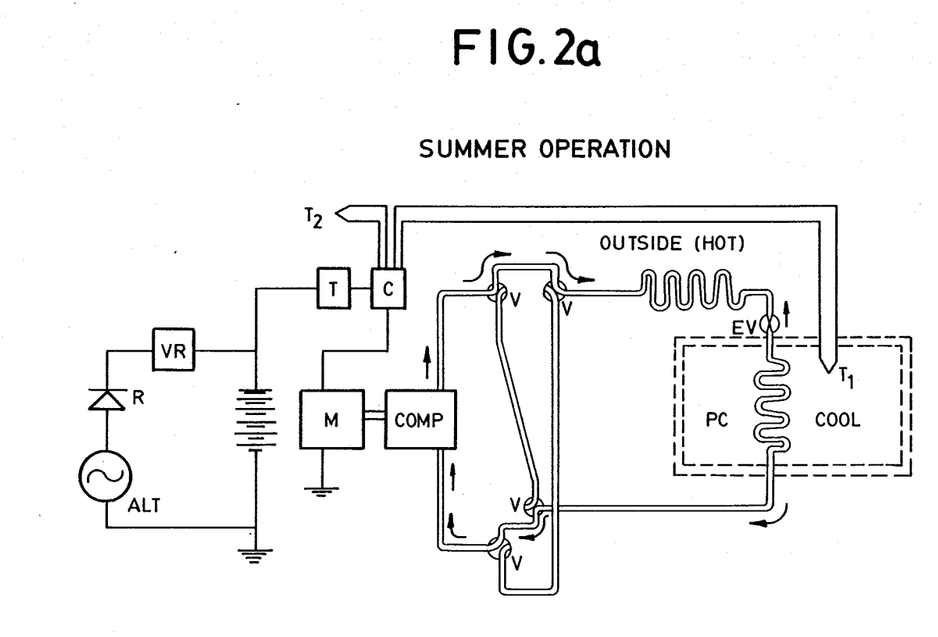
Figure 2B:
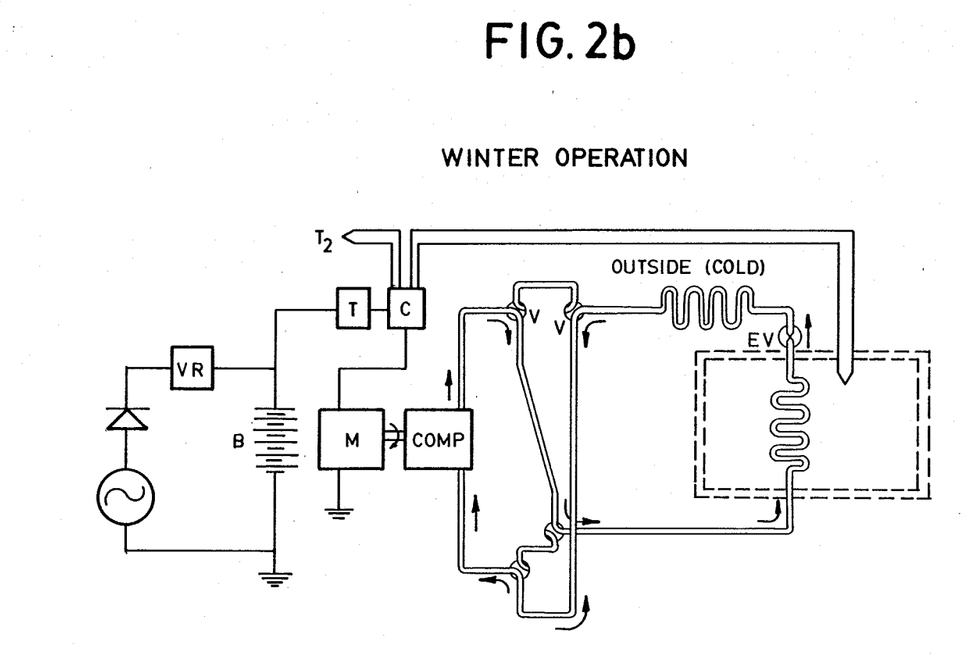

FIG. 2-A diagrammatically shows how the system operates in summer as a cooler, and FIG. 2B diagrammatically shows operation in winter as a heater of the passenger compartment. The alternator ALT, rectifier R, voltage regulator R, and storage battery B, are shown as in any standard American car. The alternator is, of course, on only when the engine is running and drives it. T is a timer, and C is an electronic or electromechanical controller, including thermocouples or thermistors T1 and T2, which senses the temperatures at T1 inside the passenger compartment, and at T2 in the ambient air. The timer and controller, according to setting determined by the operator, the electric motor M is turned on, is powered by the battery B, and drives the compressor COMP of the refrigerator/heat-pump system. Refrigeration fluid flow directions are shown by the arrows. Electromechanical actuators (not shown) turn the valves V to the directions indicated for either cooling the passenger compartment as shown in FIG. 2-1, summer operation, or heating it as shown in FIG. 2B, winter operation. In summer operation, the hot compressed fluid is cooled by the outside air and then throttled through the expansion valve EV so as to evaporate in the coils inside the passenger compartment. The gas is returned to the compressor as in any normal refrigeration system. The amount of heat removed from the passenger compartment is equal to the mechanical energy supplied to the compressor by the motor times the "coefficient of performance" (C.O.P.) of the refrigerator.

In winter operation, the valves V are turned the other direction as shown in FIG. 2-B. In this case, the hot fluid from the compressor is cooled inside the passenger compartment and so heats it. The fluid is then expanded through the expansion valve EV where it evaporates in the cold outside heat exchanger and absorbs heat from the outside air around it. It is this heat which is pumped into the passenger compartment. Again, the heat pumped is the mechanical energy times the C.O.P. For typical refrigerants and refrigeration cycles the C.O.P. is between 4 and 5, and is dependent on the temperature differences involved.

The operation of the system may be varied considerably to meet particular needs; however, the following is a typical pattern of operation in a warmer climate where cooling of the interior of the automobile is desired.

The placement of the components of the system depicted in FIG. 2 is not critical, except that the evaporator of the air conditioner or condenser of the heat-pump must be in or in thermal communication with the passenger compartment of an automobile. The temperature sensor T1 must also be in or in thermal communication with the passenger compartment of an automobile and, if used, the temperature sensor T2 must be outside the car or in thermal communication with the temperature outside the car. The other components may be placed anywhere it is convenient. Typically, of course, the conventional alternator and voltage regulator and battery system would be used. The motor and compressor for the air conditioner may be located in the engine compartment, in the luggage compartment, or elsewhere, as may be desired.

When the operator desires to park the car and leave it in a hot place, for example, in bright sun or in a hot garage, etc., in a warmer climate, the operator may elect to use the invention to great advantage. The operator would cover the windows with the insulating panels, whereas the panels 112 and 114 would be moved, manually or by suitable drive means, to cover the windshield 102 and the back window 104, respectively. Similarly, either manually or by suitable mechanical or electrical or other drive mechanism, the panels 116 and 118 are moved upwardly to cover the windows 106 and 108 respectively. As will be discussed in considerable detail hereinafter, this feature of the invention is absolutely essential for the success of the invention, as it is impractical, in a hot climate, to provide a battery-operated air conditioner of sufficient capacity to cool a car without insulating the windows and walls to prevent the excessive transfer of thermal energy through the windows and walls.

The controller may be the car's main computer, which is now standard in most larger automobiles, or the controller may be a special microprocessor. The design and constructions of microprocessors and computers for turning circuits on and off, etc., is well known and not, per se, part of the invention. Through a suitable controller, the operator may choose to maintain the temperature of the interior of the automobile between prescribed limits, or at a prescribed temperature. Alternatively, the operator may select a particular time for the air conditioner to turn on and cool the car before the operator's return. If, for example, the operator planned to be away from the car for seven or eight hours, it would not be necessary, in many instances, to maintain the interior temperature of the automobile at a comfortable level for the entire period. In that case, at an appropriate time before the expected return of the operator, the controller would turn the air conditioner on and bring the temperature of the interior of the passenger compartment down to a comfortable level by the time the operator returned.

If, however, there are perishables or other materials, such as vegetables or candy, etc., in the car which might be damaged by very high temperatures, the temperature in the passenger compartment may be maintained at a single temperature during the entire absence of the operator.

In colder climates, the mode of operation is essentially the same, except that instead of turning an air conditioner on to cool the car, the system is automatically changed to reverse-cycle heat-pump to warm the car, either at a preset time to warm the car for the operator's return, or to maintain the temperature in the car above a certain preset temperature at all times during the operator's absence.

There are certain important criteria which must be met in order for the invention to function and have practical utility. The overriding consideration is that the energy consumed by the air conditioner or the reverse-cycle heater must not exceed the reasonable capacity of the automobile battery, either a conventional battery or an expanded-capacity battery, leaving ample reserves for starting and operating the automobile at the end of the expected period of absence of the operator. As the cycle-life of a storage battery is a strong function of the depth to which it is discharged, it is important to limit the discharge amount. Also, certain battery constructions are better than others if deep-discharges are necessary. This overriding requirement cannot be met without providing suitable insulation over the windows of the automobile through which much of thermal energy flows. It is presumed, and necessary, that the automobile compartment be suitable insulated; however, the provision of suitable insulation throughout the remainder of the car, excluding the windows, is a conventional and easily achieved goal. There is a particularly critical relationship between the amounts of the insulation provided over the windows, the size of the air conditioner or heater, and the capacity of the battery which must be met. These considerations have been studied, and the data are depicted in FIGS. 3 through 10.

Figure 3:
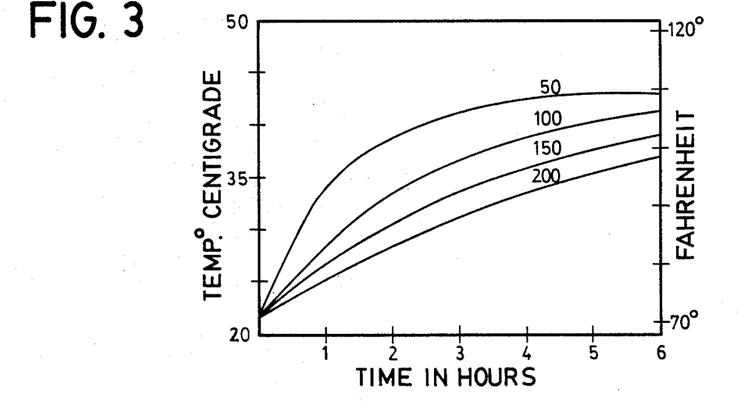
FIG. 3 depicts the results of the calculated temperature inside the passenger compartment as a function of time, the curves representing increasing amounts of thermal mass inside the insulated region.
Figure 4:
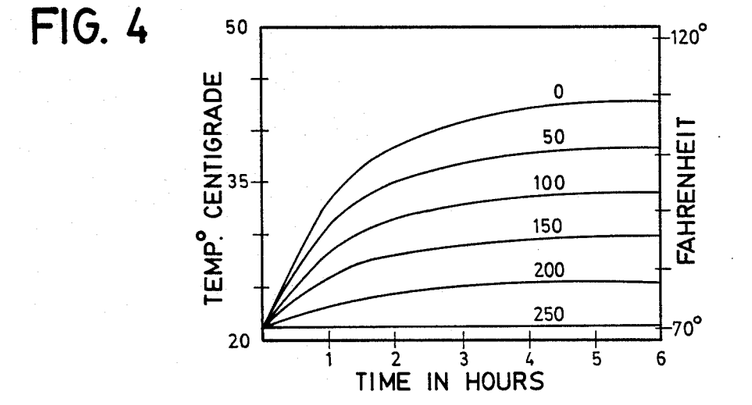
FIG. 4 depicts the temperature inside the passenger compartment of an automobile as a function of time, wherein the automobile has 20 mm of urethane insulation on the inside of the passenger compartment, the curves depicting various amounts of refrigeration.
Figure 5:
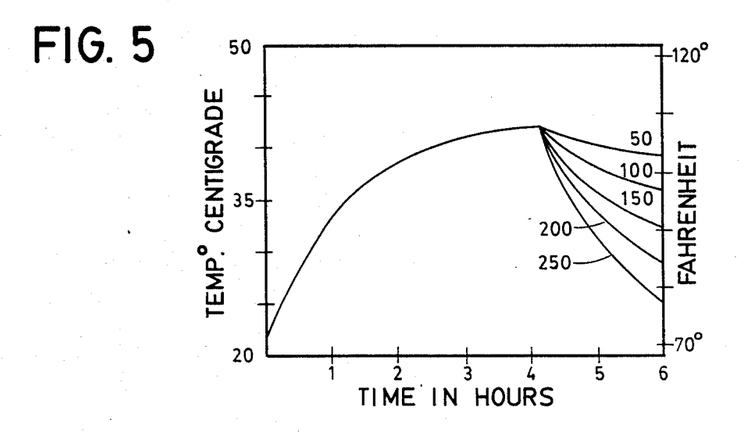
FIG. 5 depicts the calculation of the cooling effect of turning on various amounts of refrigeration in an insulated car after a period of time.

Referring first to FIG. 3, the temperature inside an automobile passenger compartment as a function of time is plotted, using the following constants and criteria. The outside temperature is 110° F. The initial inside temperature in the automobile passenger compartment is 70° F. The data in FIGS. 3, 4 and 5 are also based upon a covering of urethane insulation having a thickness of 20 mm, as will be described, over the windows. The four curves indicate the inside temperature as a function of time for four different sizes of automobiles, having different inside thermal mass values of, respectively, 50 kilograms per degree C (kg/°C.), 100 kg/°C., 150 kg/°C. and 200 kg/°C. FIG. 4 depicts the temperature as a function of time in a passenger car as described with respect to FIG. 3, but with the addition of varying amounts of refrigeration, the respective curves depicting, from the top, zero refrigeration, 50 watts of refrigeration energy input to the passenger compartment, 100, 150, 200 and 250 watts of refrigeration input to the passenger compartment, respectively for the curves shown in FIG. 4. It may not be economical or necessary that the air conditioner input to the passenger compartment be sufficient to maintain the temperature at the starting temperature, i.e. 70° C., as indicated by the 250-watt refrigeration input line, and the use of this amount of power would be prohibitive with conventional battery capacity. Using suitable insulation, and suitably efficient air conditioning units, however, it is entirely feasible to maintain the temperature at under 90° F. and even possible to maintain the temperature under 80° F., assuming an outside temperature of 110° F., for a long period of time.

In FIG. 4, as the curves clearly depict, the maintenance air conditioner of this invention is turned on, and of course the insulation is in place, at the time the operator leaves the car and operates for a period of 6 hours, the assumed return time of the operator.

In FIG. 5, a more efficient mode of operation is depicted, where it is not necessary to maintain the temperature of the car during the entire period of a long absence. The initial curve I in FIG. 5 depicts the increase in temperature inside the passenger compartment for a period of 4 hours at which time the timer T, as shown in FIG. 2, turned the air conditioner on. The curves after the initial curve I depict the cooling of the temperature assuming levels of 50 through 250 watts of refrigeration input to the passenger compartment. Clearly, unless constant maintenance of the interior temperature is vital, this mode of operation is far more efficient if the expected time of return is reasonably certain.

Figure 6:
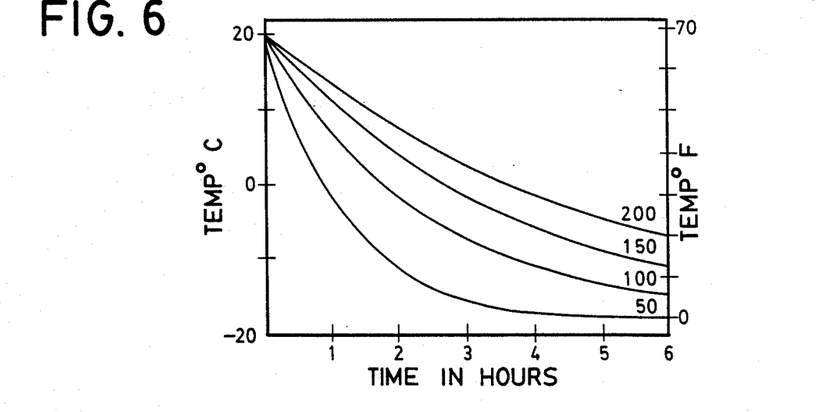
FIG. 6 depicts the effect of varying amounts of thermal mass inside the car on the rate of cooling of the car with an initial temperature of 70° F. inside and an outside temperature of 0° F.
Figure 7:
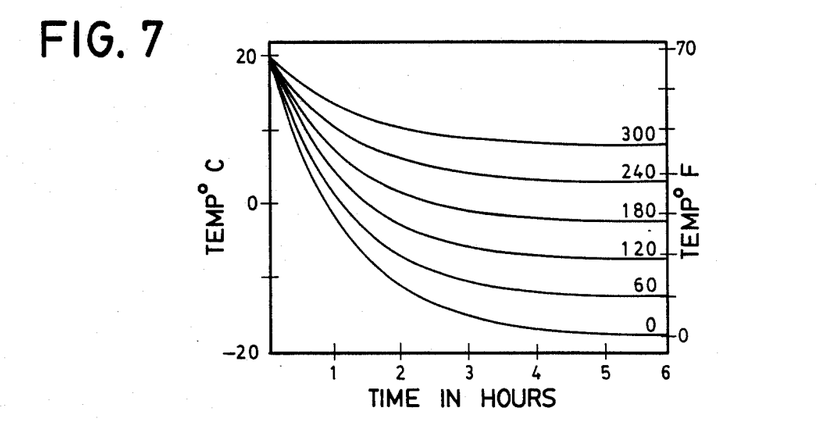
FIG. 7 depicts the rate of cooling of the car assuming a beginning temperature of 70° F., with the windows insulated, and varying amounts of heat input.
Figure 8:
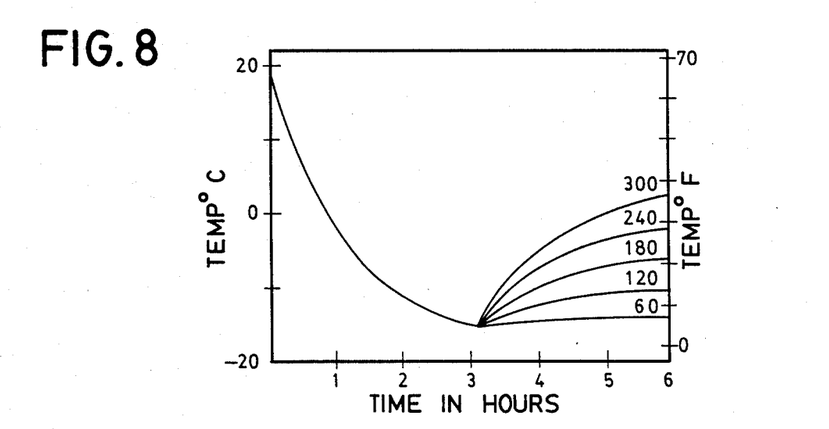
FIG. 8 depicts the warming of a car with varying degrees of heat, with the windows insulated, after a period of cooling.

FIGS. 6, 7 and 8 are analogous to FIGS. 3, 4 and 5, except that in FIGS. 6, 7 and 8, the data result from an initial temperature of 70° F. and an outside temperature of 0° F. with the addition of heat to the passenger compartment, rather than air conditioning as was the case in the data depicted in the graphs of FIGS. 3, 4 and 5.

As was described previously, the automobile windows are insulated with 20 mm of urethane insulation, the nature of which will be described hereinafter. The curves in FIG. 6 depict the thermal mass of the inside of the automobile in kilojoules per degree centigrade (kg/°C.), at levels of 50, 100, 150 and 200 kg/°C. The curves in FIG. 7 depict the inside temperature of the automobile with differing levels of heat input, from zero through 300 watts of heat introduced into the passenger compartment, being depicted by the various curves, starting at the bottom at zero watts of heat input with curves showing the input of 60, 120, 180, 240 and 300 watts.

It should be noted that any insulating panels of generally comparable insulating value, such as, for example, hollow or expanded polystyrene-filled panels sealed at the edges to prevent convection may be used in place of the closed-pore urethane which has been described as preferred. The exact composition or construction of the insulation is not critical, so long as it functions in the manner described.

As in FIG. 4, the introduction of heat into the passenger compartment was begun at zero time, at the time the operator left the car, with a presumed return of 6 hours later.

FIG. 8, as in FIG. 5, depicts the operation of the system in a more efficient manner, the initial curve I being the temperature drop of the passenger compartment for the first 3 hours at which time the heater is turned on resulting in the temperatures shown by the plurality of curves on the right-hand portion of the graph, the respective curves depicting introduction of 60°, 120°, 180°, 240° and 300° watts of heat energy introduced into the passenger compartment.

The data set forth in graphical form in FIG. 3 through 9 were based upon the following foundational data and values. A foam polyurethane insulating pad was taken as a basis for calculating the insulting value of the insulating pads over the windows, windshields, and the rear window. The particular foam urethane referred to was manufactured by the Upjohn Company and had a thermal conductivity of 0.022 watt per meter degree centigrade, or $2.02 \times 10^{-4}$ watt/cm°C. Now obviously the particular kind of insulation is not critical, so long as it has a thermal conductivity low enough to provide the necessary insulation for preventing excess thermal flow through the windows of the car. Polystyrene has a lower thermal conductivity, but is not structurally as strong and easily handled as polyurethane foamed insulation. As a model for the calculations, a four-door passenger sedan, having a window surface area of 4,257 square inches was taken for reference. The surface of the top, the two sides, the engine fire wall, the rear and the bottom were totalled to 17,963 square inches.

A maximum temperature differential for which compensation would be made was selected at a $\Delta T$ of 40° F. or 22° C. Using average efficiency of conversion from electric energy to cooling energy, and assuming an automobile battery storage capacity of 150 ampere hours, it was determined that thermal energy input to or extraction from the passenger compartment of the automobile could be as high as 300 thermal watts without unduly discharging the battery over a period of up to 6 to 8 hours of absence of the operator. The calculations resulted in the data which are shown graphically in FIGS. 3 through 9 which establish that it was theoretically possible to achieve the desired goal, namely maintaining a reasonably comfortable temperature inside the passenger compartment of the automobile at either maximum expected or minimum expected reasonable exterior temperatures. As the data in the figures show, it would not be practical to compensate for all possible maximum and minimum temperatures and maintain the passenger compartment at a temperature of a comfortable 70° F.; however, the desired comfortable temperature can be approached within reasonable limits using up to 300 thermal watts of energy. If auxiliary storage capacity for electrical energy is provided by way of large industrial batteries or auxiliary batteries and generating power, it would be possible to achieve a 70°-passenger compartment temperature after a reasonable period of time under virtually any possible climatic conditions. It was not considered necessary, however, to design for the most extreme possible circumstances.

In order to determine whether the calculations previously described were sufficiently valid as applied to an actual automobile, an experiment was performed using a 1982 Oldsmobile Delta 88 as the test object. A 225-watt heater (two flood lamps) was mounted inside the car so as to shine on the roof. The automobile was parked in a closed garage, and the temperature inside the car and inside the garage were measured as a function of time. In one case the automobile was as manufactured (nothing added). In the second case, one inch of polyurethane foam insulation was mounted on the inside surface of all of the windows. The areas of various automobile surfaces are as follows:

| Surface | Area in Square Centimeters |
| --- | --- |
| Windshield | 8383 |
| Rear Window | 5677 |
| Front Door Window | 2714 (each) |
| Rear Door Window | 2821 (each) |
| Total All Windows: | 25132 (22% of total) |
| Top | 19500 |
| Sides Minus Windows (passenger compartment only) | 13300 |
| Engine Fire Wall | 9500 |
| Trunk Wall | 9000 |
| Floor | 26000 |
| Total | 115600 |

| Handbook Values | |
| --- | --- |
| Material | Thermal Conductivity Watt/Cm. Deg. C. |
| Glass | 0.0105 |
| Air | 0.00022 |
| Plastic | 0.002 |
| Urethane Foam | 0.00025 |

Air-solid interfaces: $h = 0.0012 + 0.00014\, V$ watt/cm$^2$deg. C.; where V is the wind velocity in MPH.

The overall thermal resistance of the compartment walls "as is" equals 0.0346 deg. C/watt. This number is simply the temperature difference generated in steady-state divided by the heat power employed.

With foam on all windows, the thermal resistance was increased to 0.0617 deg. C/watt, which is a 78% increase and indicates that 44% of the heat conduction involved, flows through the windows.

Figure 9:
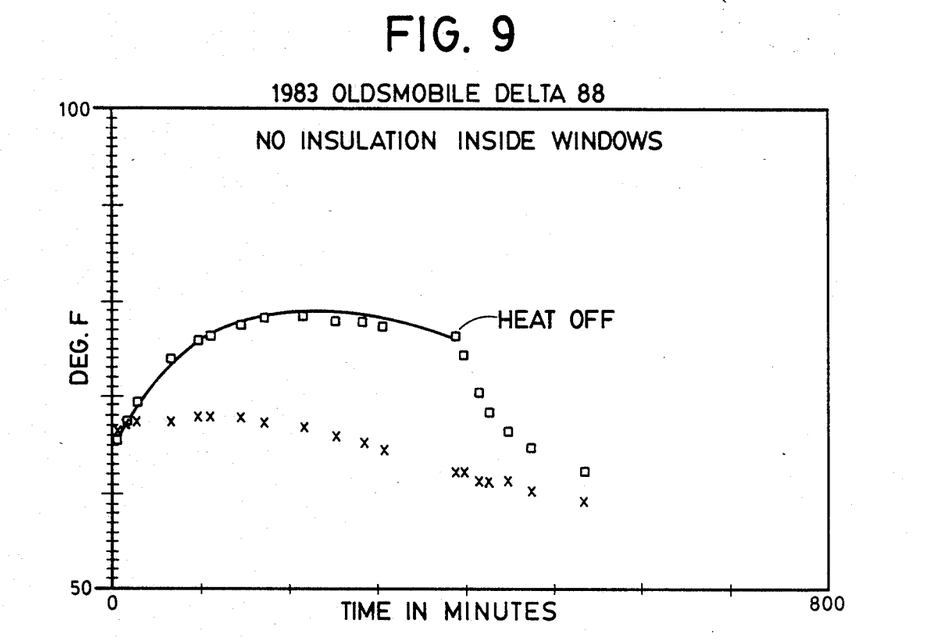
FIG. 9 is a graphical depiction of data resulting from an actual experiment showing the inside temperature of a car (upper curve) and temperature inside the garage (lower curve) as a function of time without insulation on the windows, and with the addition of 225 watts of heat to the inside of the car.

FIG. 9 is a time-plot. The curve marked by x's depicts the inside temperature of the garage. The curve marked by closed squares depicts the inside temperature of the Oldsmobile when a 225-watt heater lamp was placed inside with the windows closed. The sharp break in the curve at 382 minutes occurred when the power was turned off.

The thermal time constant for this case is 55 minutes.

Figure 10:
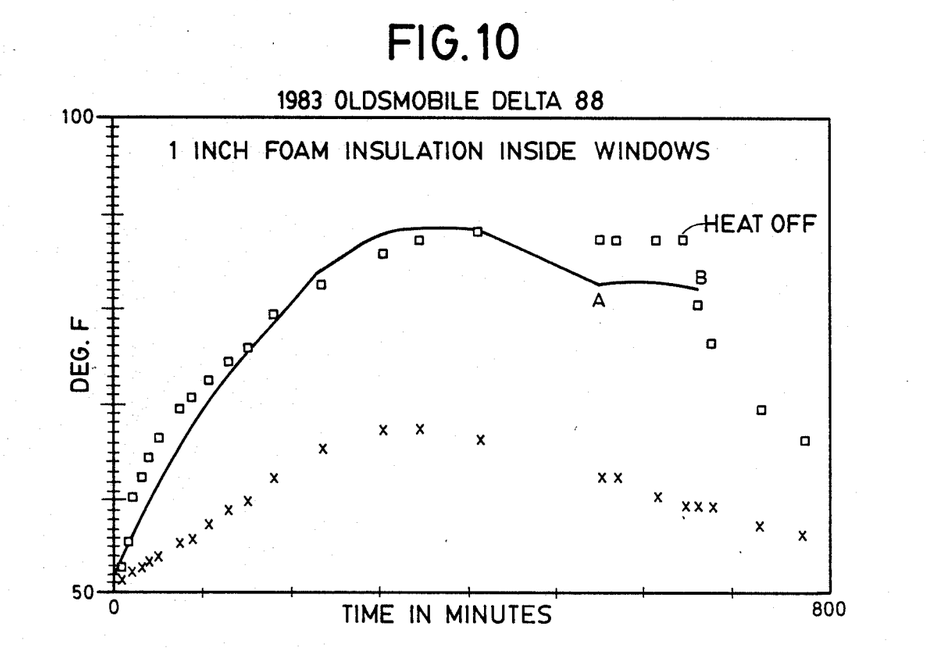
FIG. 10 depicts data from an actual experiment corresponding to the experiment in FIG. 9, except with the addition of 1" foam insulation inside the windows. The curve marked by x's depicts the temperature inside the garage, and the curve marked by closed squares depicts the temperature inside the car with a 225-watt heater inside.

FIG. 10 is a similar plot with one inch of foam pad added to the inside surface of all the window areas. At the time indicated by the letter A, an additional one inch of foam pad was placed over the entire top of the car. At time B, the heater was turned off. The thermal time constant for this case is 130 minutes.

TABLE 1

| Heat Conducting Element | Conduction in Watts/Deg. C. (Calculated Values) | |
|---|---|---|
| | Glass | Glass & Foam (1 in.) |
| Windshield | 4.9 | 0.7 |
| Rear Window | 3.4 | 0.5 |
| Front Door Windows | 3.2 | 0.4 |
| Rear Door Windows | 3.3 | 0.4 |
| Total All Windows | 14.8 | 2.0 |

$W1$ = Glass thickness = 0.4 cm
$W2$ = Polyurethane foam thickness = 2.54 cm
$W3$ = Plastic thickness inside safety glass = 0.085 cm
$h$ = Air-film coefficient = 0.00124 watts/cm$^2$deg. C.
$k2$ = Foam conductivity = 0.00025 watts/cm deg. C.
$k1$ = Glass conductivity = 0.0105
$k3$ = Plastic conductivity = 0.002
$R$ = Thermal resistance for an area of A square centimeters.
$A \times R = 2(1/h) + W1/k1 + W2/k2 + W3/k3$ deg. C/watt
$C$ = Conduction = $1/R$ (Note that for no foam, $W2=0$.)

Measured total automobile compartment wall conduction including uninsulated windows: CO = 28.9 watts/deg. C.

Measured with insulated windows: C1 = 16.2 watts/deg. C.

Calculated uninsulated window conduction = 14.8 watts/deg. C.

Calculated insulated window conduction = 2 watts/deg. C.

The body thermal conductance is defined here as the conductance exclusive of window areas.

Heat Balance:
Body thermal conductance from case 1: 28.9 − 14.8 = 14.1 watts/deg. C.
Body thermal conductance from case 2: 16.2 − 2 = 14.2 watts/deg. C.

This agreement shows how well the actual results agree with the theory.

Projected Results

For an outside temperature of 110 deg. F., and an inside temperature of 80 deg. F., the heat flow with no foam is calculated as 497 watts. With foam on the windows alone it would be 270 watts. This could be reduced to 200 watts if a bit more insulation was added to the body areas. In the case of the Oldsmobile, the roof already is insulated with a foam pad which is about 8 mm thick. This should be increased to at least 15 mm, and an insulating pad should be added to the floor, under the carpet, example, or on the underside of the floor as an insulating and rust preventing layer, or in any other convenient manner. The air-space created by adding retractable window insulators to the doors will suffice as additional door insulation. With these criteria met, a refrigeration power of 200 watts derived from 40 watts of electric power and a refrigeration coefficient of performance (C.O.P.) of 5 will be sufficient for even the most rigorous outside conditions.

Battery Power Considerations

Forty watts at 12 volts is a drain of 3.33 amps. For a total elapsed time of 2 hours, this would drain 6.7 amp-hours. For a fully charged battery, this is less than 10%. To replace it would require a driving time of about 15 minutes.

There is no good reason to keep the car cool for long periods if the time of departure is approximately known. In this case the automobile computer would be told of the desired departure time, and it would turn on the auxiliary refrigeration compressor at the proper time to get the car ready for occupancy.

The panels are, preferably formed of closed-pore foamed polymer, such as, for example a polyurethane. The panels are preferably opaque, thereby preventing persons outside the automobile from seeing articles in the automobile passenger compartment. The panels may of any suitable insulating construction and material and may, for example, comprise spaced apart, rigid, rugged surface sheets and an edge seal defining dead air insulating space therebetween or of spaced apart, rigid, rugged surface sheets and an edge seal and a very high insulating value expanded polymer insulating layer therebetween such as, for example, expanded polystyrene. A thin layer of a tough polymer such as a polycarbonate sandwiching expanded polystyrene is an example of the latter type of panel construction. With suitable panels of sufficient insulating value, in most cases which will be encountered by drivers, no refrigeration will probably be needed, as the sun-blockage alone together with the insulation will suffice to keep the car cool or hot enough for the normal passenger.

What is claimed is:

1. In an automobile which comprises a body defining a passenger compartment, window openings and door openings, doors covering the door openings defining window openings in the doors, windows covering the window openings in the body, and an electric storage battery, the improvement where in the automobile further comprises a thermal control system for controlling the temperature inside the body during periods of parking, the thermal control system comprising:

(a) insulating means comprising a plurality of insulating means, the insulating means being moveable, respectively, from a position covering the respective windows in the body and the doors to a position revealing said windows to permit vision therethrough from the passenger compartment;

(b) refrigeration means for cooling the passenger compartment during periods of parking; and (c) control means for connecting the refrigeration means to the storage battery for powering and operating the refrigeration means in accordance with predetermined control criteria;

the insulating means being so constructed and disposed over the windows as to limit the heat flow into and out of the passenger compartment to the exterior of the automobile to no greater than a predetermined rate when the exterior of the car is at temperatures above about 80° F. and no greater than about 130° F.;

the refrigeration means being so constructed and designed as to be capable, when connected to the battery means, of introducing refrigeration cooling into the passenger compartment at about said predetermined rate;

the insulation value of the insulating means, the electrical storage capacity of the storage battery and the coefficient of performance of the refrigeration means being, respectively, such that the refrigeration means is capable of maintaining the temperature in the passenger compartment at a temperature of from about 80° F. to about 90° F. when the temperature outside the automobile is from above 90° F. and up to about 130° F. for a period of from about two to about eight hours without using more than about one-half of the electric energy capable of being stored in the battery.

2. The thermal control system of claim 1 wherein the insulation value of the insulating means, the electrical storage capacity of the storage battery and the coefficient of performance of the refrigeration means being, respectively, such that the refrigeration means is capable of maintaining the temperature in the passenger compartment at a temperature of from about 80° F. to about 90° F. when the temperature outside the automobile is from above 90° F. and up to about 110° F. for a period of from about two to about eight hours without using more than about one-fourth of the electric energy capable of being stored in the battery.

3. The thermal control system of claim 1 wherein the insulation value of the insulating means, the electrical storage capacity of the storage battery and the coefficient of performance of the refrigeration means being, respectively, such that the refrigeration means is capable of maintaining the temperature in the passenger compartment at a temperature of from about 80° F. to about 90° F. when the temperature outside the automobile is from above 90° F. and up to about 110° F. for a period of up to about six hours without using more than about one-tenth of the electric energy capable of being stored in the battery.

4. The system of claim 1 wherein a second door-lock on the front doors of the vehicle enables the operation of the insulation means to be set into motion.

5. The system of claim 4 wherein the insulating means automatically retract when the door-lock is opened with a key, or an inside switch.

6. The system of claim 1 wherein the insulating means are easily retracted manually in case of system failure.

7. The system of claim 1 wherein the insulating-hiding from view means are partially deployed at the command of the operator.

8. The system of claim 1 wherein automatic deployment of the front-window insulating means is prevented by a fail-safe system when the automobile is in motion.

9. In an automobile which comprises a body defining a passenger compartment, window openings and door openings, doors covering the door openings defining window openings in the doors, windows covering the window openings in the body, and an electric storage battery, the improvement where in the automobile further comprises a thermal control system for controlling the temperature inside the body during periods of parking, the thermal control system comprising:

(a) insulating means comprising a plurality of insulating pads, the insulating pads being moveable, respectively, from a position covering the respective windows in the body and the doors to a position revealing said windows to permit vision therethrough from the passenger compartment;

(b) heating means for heating the passenger compartment during periods of periods of parking; and (c) control means for connecting the heating means to the storage battery for powering and operating the heating means in accordance with predetermined control criteria;

the insulating means being so constructed and disposed over the windows as to limit the heat flow into and out of the passenger compartment to the exterior of the automobile to no greater than a predetermined rate when the exterior of the car is at temperatures below about 30° F. and no lower than about −30° F.;

the heating means being so constructed and designed as to be capable, when connected to the battery means, of introducing heat into the passenger compartment at about said predetermined rate;

the insulation value of the insulating means, the electrical storage capacity of the storage battery and the coefficient of performance of the heating means being, respectively, such that the heating means is capable of maintaining the temperature in the passenger compartment at a temperature of from about 32° F. to about 50° F. when the temperature outside the automobile is from below 30° F. and above about −30° F. for a period of from about two to about eight hours without using more than about one-half of the electric energy capable of being stored in the battery.

10. The thermal control system of claim 9 wherein the insulation value of the insulating means, the electrical storage capacity of the storage battery and the coefficient of performance of the refrigeration means being, respectively, such that the refrigeration means is capable of maintaining the temperature in the passenger compartment at a temperature of from about 35° F. to about 50° F. when the temperature outside the automobile is from below 30° F. and down to about −30° F. for a period of from about two to about eight hours without using more than about one-fourth of the electric energy capable of being stored in the battery.

11. The thermal control system of claim 9 wherein the insulation value of the insulating means, the electrical storage capacity of the storage battery and the coefficient of performance of the refrigeration means being, respectively, such that the refrigeration means is capable of maintaining the temperature in the passenger compartment at a temperature of from about 35° F. to about 50° F. when the temperature outside the automobile is from below about 30° F. and down to about −30° F. for a period of up to about six hours without using more than about one-tenth of the electric energy capable of being stored in the battery.

12. In an automobile which comprises a body defining a passenger compartment, window openings and door openings, doors covering the door openings defining window openings in the doors, windows covering the window openings in the body, and an electric storage battery, the improvement where in the automobile further comprises a thermal control system for controlling the temperature inside the body during periods of parking, the thermal control system comprising:

(a) insulating means comprising a plurality of insulating pads, the insulating pads being moveable, respectively, from a position covering the respective windows in the body and the doors to a position revealing said windows to permit vision therethrough from the passenger compartment;

(b) refrigeration and heating means for selectively cooling or heating the passenger compartment during periods of periods of parking; and (c) control means for connecting the refrigeration and heating means to the storage battery for powering and operating the refrigeration and heating means in accordance with predetermined control criteria;

the insulating means being so constructed and disposed over the windows as to limit the heat flow into and out of the passenger compartment to the exterior of the automobile to no greater than a predetermined rate when the exterior of the car is at temperatures above about 80° F. and no greater than about 130° F.;

the refrigeration and heating means being so constructed and designed as to be capable, when connected to the battery means, of introducing cooling or heat into the passenger compartment at about said predetermined rate;

the insulation value of the insulating means, the electrical storage capacity of the storage battery and the coefficient of performance of the refrigeration and heating means being, respectively, such that the refrigeration and heating means is capable of maintaining the temperature in the passenger compartment at a temperature of from about 80° F. to about 90° F. when the temperature outside the automobile is from above 90° C. and up to about 130° C. for a period of from about two to about eight hours without using more than about one-half of the electric energy capable of being stored in the battery and of maintaining the temperature in the passenger compartment at a temperature of from about 32° F. to about 50° F. when the temperature outside the automobile is from below 30° F. and above about −30° F. for a period of from about two to about eight hours without using more than about one-half of the electric energy capable of being stored in the battery.

13. The thermal control system of claim 12 wherein the insulation value of the insulating means, the electrical storage capacity of the storage battery and the coefficient of performance of the refrigeration and heating means being, respectively, such that the refrigeration and heating means is capable of maintaining the temperature in the passenger compartment at a temperature of from about 80° F. to about 90° F. when the temperature outside the automobile is from above 90° C. and up to about 110° C. for a period of from about two to about eight hours without using more than about one-fourth of the electric energy capable of being stored in the battery and of maintaining the temperature in the passenger compartment at a temperature of from about 35° F. to about 50° F. when the temperature outside the automobile is from below 30° F. and above about −30° F. for a period of from about two to about eight hours without using more than about one-fourth of the electric energy capable of being stored in the battery.

14. The thermal control system of claim 12 wherein the insulation value of the insulating means, the electrical storage capacity of the storage battery and the coefficient of performance of the refrigeration and heating means being, respectively, such that the refrigeration and heating means is capable of maintaining the temperature in the passenger compartment at a temperature of from about 80° F. to about 90° F. when the temperature outside the automobile is from above 90° C. and up to about 110° C. for a period of up to about six hours without using more than about one-tenth of the electric energy capable of being stored in the battery and of maintaining the temperature in the passenger compartment at a temperature of from about 35° F. to about 50° F. when the temperature outside the automobile is from below 30° F. and above about −30° F. for a period of up to about six hours without using more than one-tenth of the electric energy capable of being stored in the battery.

15. The system of claim 12 wherein the pads are formed of closed-pore foamed polymer.

16. The system of claim 15 wherein the polymer is a polyurethane.

17. The system of claim 12 wherein the pads include indicia which relate to the identity of the owner.

18. The system of claim 12 wherein the pads are opaque, thereby preventing persons outside the automobile from seeing articles in the automobile passenger compartment.

19. The system of claim 12 wherein the pads comprise spaced apart, rigid, rugged surface sheets and an edge seal defining dead air insulating space therebetween.

20. The system of claim 12 wherein the pads comprise spaced apart, rigid, rugged surface sheets and an edge seal and a very high insulating value expanded polymer insulating layer therebetween.

21. The system of claim 20 wherein the expanded polymer is expanded polystyrene.

22. The system of claim 12 wherein the pads are formed by stretching and positioning tight, thin, opaque, but highly light-reflecting sheets of suitable material over all window areas so as to provide thermal insulating dead-air spaces inside all window areas.

* * * * *